United States Patent [19]

Lackey

[11] Patent Number: 4,564,095

[45] Date of Patent: Jan. 14, 1986

[54] FRICTION-LESS HYDRAULIC CLUTCH DEVICE

[75] Inventor: Darrell D. Lackey, Livonia, Mich.

[73] Assignee: Febco Inc., Novi, Mich.

[21] Appl. No.: 572,709

[22] Filed: Jan. 23, 1984

[51] Int. Cl.⁴ .................................................. F16D 31/02
[52] U.S. Cl. ................................................. 192/59; 192/60
[58] Field of Search ...................................... 192/59, 60

[56] References Cited

U.S. PATENT DOCUMENTS

| | | | |
|---|---|---|---|
| 1,296,371 | 3/1919 | Dickman | 192/59 |
| 1,450,441 | 4/1923 | Johnson | 192/59 |
| 1,450,919 | 4/1923 | Holpfer | 192/59 |
| 2,218,558 | 10/1940 | Staats | 192/59 |
| 3,488,980 | 1/1970 | Burrough | 192/59 |
| 3,530,964 | 9/1970 | Maguire | 192/59 |
| 4,142,617 | 3/1979 | Collier | 192/60 |
| 4,456,110 | 6/1984 | Hanks et al. | 192/59 |

*Primary Examiner*—Henry C. Yuen
*Attorney, Agent, or Firm*—Lyman R. Lyon

[57] ABSTRACT

This clutch device is designed to be friction-less, and it employs hydraulic fluid for the engaging action upon a drive flange, without the use of friction linings. Primarily, it consists of an internal housing, return spring, piston and pushrod, which are moved by a cam rotated by the power source to cause a pumping action in the housing. Check valves are also included in the stationary housing, and apply and release control valves of the stationary housing open and close the fluid passages, for the clutch engaged, or released clutch condition.

1 Claim, 2 Drawing Figures

FRICTION-LESS HYDRAULIC CLUTCH DEVICE

This invention relates to liquid filled devices for rotary motion transmission, and more particularly, to a friction-less hydraulic clutch device.

The principal object of this invention is to provide a friction-less hydraulic clutch device, which will be unique and novel, in that it will eliminate dependence upon friction, as do devices of the prior art.

Another object of this invention is to provide a friction-less hydraulic clutch device, which will eliminate pressure plates and/or friction discs.

Another object of this invention is to provide a friction-less hydraulic clutch device, which will eliminate the use of friction linings, which need periodic maintenance and replacement.

A further object of this invention is to provide a friction-less hydraulic clutch device, which will be of such structure, as to be a completely sealed assembly, the performance of which is virtually unaffected by environmental conditions.

Still a further object of this invention is to provide a clutch device, which has the capability of delivering the full range of infinitely variable speed or gear ratios, when coupled with either flow control or pressure control devices, or a combination thereof, which are common to the art, and may be manually or automatically actuated.

A still further object of this invention is to provide a clutch device of said infinitely variable ratio capability, and, in so doing would eliminate the necessity for torque converters, multiple forward clutches, and or gearing in automatic or manual transmission applications.

Other objects are to provide a friction-less hydraulic clutch, which is simple in design, inexpensive to manufacture, rugged in construction, easy to use, and efficient in operation.

These, and other objects, will be readily evident, upon a study of the following specification, and the accompanying drawing wherein.

Figure 1:
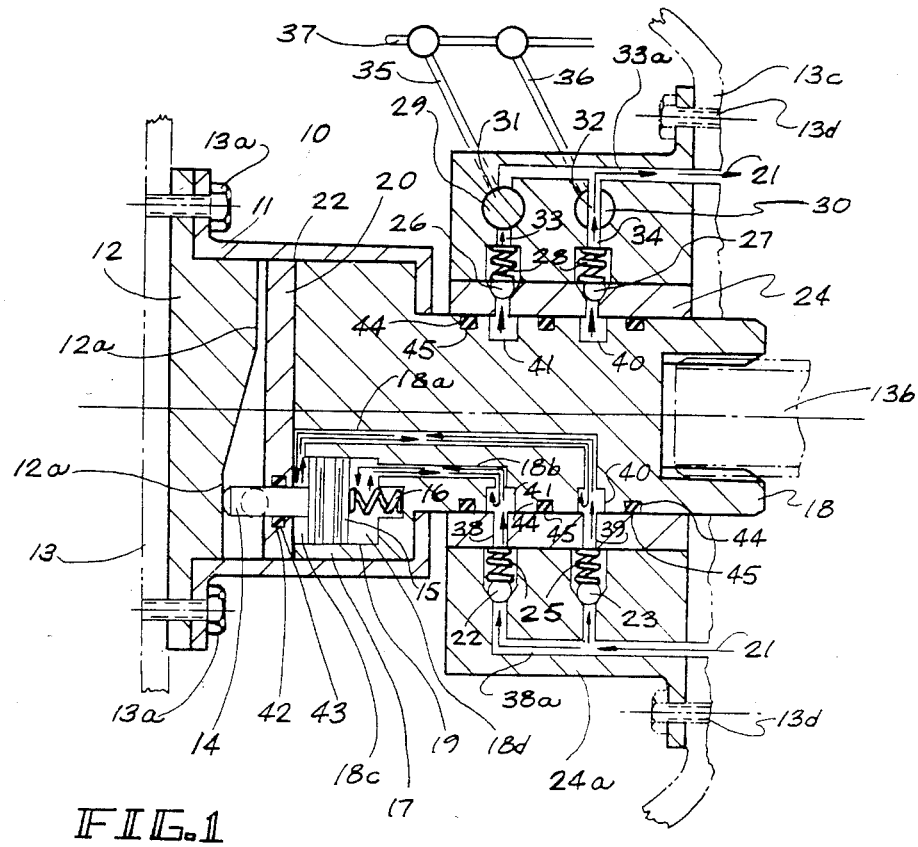
FIG. 1 is a side elevational view of the present invention, shown in cross-section, and illustrates the closed position of the apply valve, and the open position of the release exhaust valve.

According to this invention, a clutch 10 is shown to include rotating housing 11, and a drive flange 12, with integral cam surface 12a, secured to engine flywheel 13, shown in phantom, by bolts 13a.

The engine flywheel, or other source of torque, turns rotating housing 11, and drive flange 12 and cam surface 12a which is followed by pushrods 14 and pistons 15, retained on cam surface 12a by return springs 16, so as to convert rotary motion to linear motion, with respect to the internal housing 17. Internal housing 17 is an integral part of shaft 18 which serves as torque output means as well as carrying outboard passage 18a, and inboard passage 18b for carrying fluid 21 to and from release chamber 18c and apply chamber 18d respectively, The pushrods 14 are fixedly secured, in a suitable manner, to pistons 15, which are slideably received in sleeves or cylinders 19. Sleeves 19 are integral to the internal housing 17, and the outboard portion 20 serves as head means for sleeve 19. Transmission/Gearbox Housing 13c, shown in phantom, includes a reservoir compartment which is common in the art, and is filled with a pre-determined amount of fluid 21, by removing filler cap, not shown. The outboard portion 20 is sealed at its edge 22, in a suitable manner, not shown. One pair of intake check valves 22 and 23, are included in stationary 24, which seat in lower housing 24a for checking the flow of fluid 21. The lower and upper housings 24a and 24b respectively, are sealed at their edges in a suitable manner and are fixedly assembled to stationary housing 24 by bolts, not shown. Lower housing 24a and upper housing 24b are fixedly secured to transmission/gearbox 13c, shown in phantom, by bolts, 13d. Each of the intake valves 22 and 23 are controlled by springs 25 in the manner common in the art. One pair of exhaust check valves 26 and 27 are included in the upper housing 24b, and seat in housing 24, for control of the fluid 21. Both valves 26 and 27 seat in housing 24, and are controlled by springs 28. The ball-shaped apply valve 29, and release valve 30, having a centrally disposed transverse openings 31 and 32 respectively, are seated in the upper housing 24b, for opening and closing off passageways 33 and 34 respectively in upper housing 24b, and valves 29 and 30 include rods 35 and 36 respectively, which are fixedly secured thereto, for the operation of valves 29 and 30. Rods 35 and 36 extend outwards from upper housing 24b, from a cut-out slot, not shown, and are linked together for simultaneous actuation by linkage 37. Passageways 33, 33a 34, 38 and 38a and 39 in stationary housing 24, and lower and upper housing 24a and 24b respectively, provide a flow path for the fluid 21 received from and returned to the reservoir compartment, not shown, through annular grooves 40 and 41 which intersect outboard passage 18a and inboard passage 18b respectively.

It shall be noted, that a seal ring 42 is received in recessed opening 43 in the outboard housing 20, for sealing against the outer periphery of pushrod 14, to prevent leaking of fluid 21 from within the sleeve 19.

It shall also be noted, that seal rings 44 are received in recessed openings 45 in the shaft 18 for sealing against the outer periphery of said shaft, to prevent internal leaking of fluid 21. Said shaft is received in housing 24 and is affixed to the transmission/gearbox input shaft 13b, shown in phantom, by a suitable means.

In operation, during clutch engagement the rotating housing 11, when rotating, causes the drive flange 12 to rotate, which acts upon pushrods 14. The above-mentioned converts the rotary motion to linear motion upon the pushrods 14 and pistons 15. Rods 14 and pistons 15 follow the profile of cam surface 12a due to the force applied to the pistons 15, by the return springs 16. This creates a pumping action within the sleeves or cylinders 19, through an increase and decrease of fluid 21 volume in the passageways 18b, 33, 33a, 38 and 38a. The intake check valve 22 is positioned to enable fluid 21 flow in one direction only, as indicated by the arrows in shaft 18, lower housing 24a, and upper housing 24b, and the above-mentioned occurs when the release valve 30 is opened by its rod 36, which enables free flow of fluid 21, from the release chamber 18c, resulting in free inward movement of piston 15 and pushrod 14. At the same time release chamber valve 30 is opening, apply chamber valve 29 in closing, due to simultaneous actuation provided by linkage 37 acting upon rod 35. As the apply chamber valve 29 is closed by linkage 37 and rod 35, the fluid 21 flow from apply chamber 29 is restricted, this causes the linear movement of rod 14, piston 15, to slow down, and begin to engage to drive flange 12, causing torque to be transferred to the internal housing 17, and shaft 18, through rod 14. With the apply valve 29 closed completely, the clutch is fully engaged. The linear motion of rod 14 and piston 15 stops due to the non-compressibility of fluid 21, and the above-mentioned further causes all of the rotating components described to become one, with the drive flange 12.

When the device 10 assumes clutch released condition, apply valve 29 is opened, fluid 21 is allowed to flow freely from the apply chamber 18d, freeing the piston 15, and pushrod 14, to travel in the outward direction, compressing spring 16 as dictated by the rotation of cam 12, as it acts upon pushrod 14, allowing increased relative rotation of drive flange 12 with respect to internal housing 17. In simultaneous fashion as aforementioned, linkage 37 causes rod 36 to close release chamber valve 34 which restricts the exhaust flow of fluid 21 from release chamber 18c, which retains piston 15 and pushrod 14 in the outward position, due to the non-compressibility of fluid 21 held in internal housing 17, which allows load-free rotation of drive flange 12 and its connected rotating source of torque, due to the no-contact condition which exists between the drive flange 12 and pushrod 14. Hence, the piston 15 and pushrod 14 rotate independently of drive flange 12, when clutch 10 is fully released.

Figure 2:
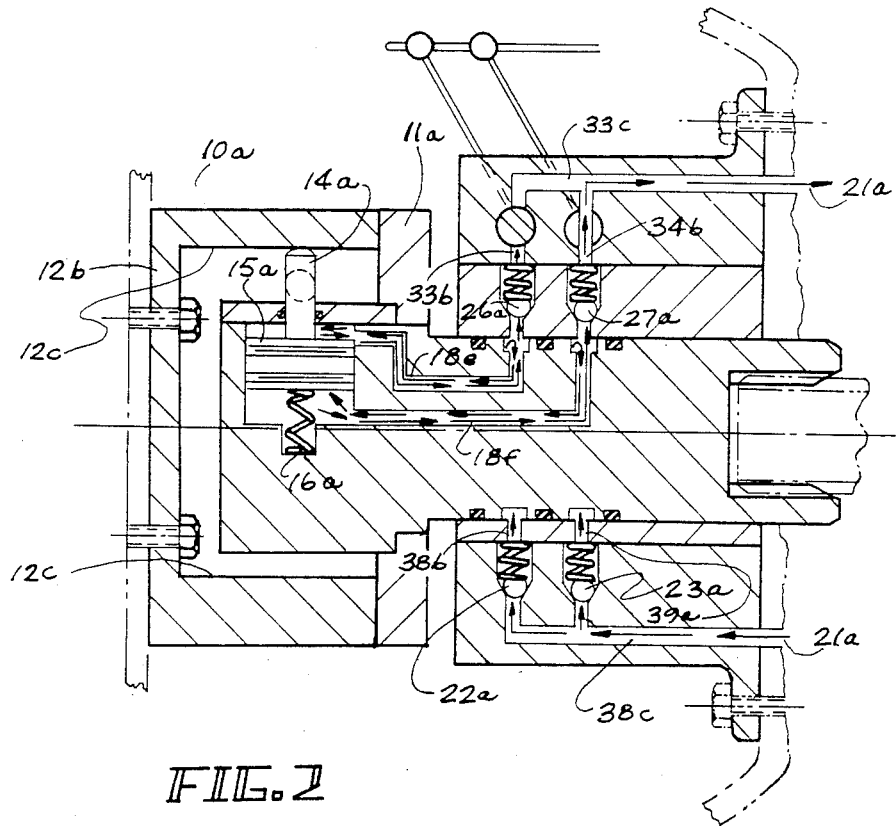
FIG. 2 is a side elevational view, shown in cross-section, of a modified form of the invention, which illustrates the closed position of the apply exhaust valve, and the open position of the release exhaust valve.

Referring now to FIG. 2 of the drawing, a modified form of clutch device 10a shown to include a housing 17b, which is similar in construction to housing 17 of device 10, heretofore described, with the exception, that housing 17b includes radially fixed, cylinders 19b, return springs 16a, pistons 15a, pushrods 14a, and drive drum 12b, which are similar in construction as was heretofore described of device 10, except that drive drum 12b, instead of having a transverse profile, has an internal peripheral cam profile 12c. The rods 35a and 36a of the respective apply and release chamber valves 29a and 30a are coupled to a linkage 37a in a pivotal manner so as to be operated simultaneously, as was previously described, to open and close the passageways 18e and 18f, which control the fluid 21a flow in 33b, 33c, 34b, 38b, 38c, and 39a. Clutch device 10a also includes check valves 22a, 23a, 26a, and 27a, which are similar to clutch device 10, as are all of the other components, not shown.

In use modified device 10a functions on the same basic principle as device 10, previously described.

It shall be noted that variations of the design may be achieved by employing a plurality of the described major components, which may be radially and/or transversely disposed. Either of the described designs are of great potential advantage, because of the absence of friction materials.

It shall also be noted that variations of either of the designs described, may be achieved by replacing the apply valve 29 with either a pressure control, or a flow control device, or a combination thereof, either manually or automatically actuated, to provide an infinitely variable range of continuous and/or predetermined ratios of other than one-to-one, which may be used to replace multiple gearing and/or multiple clutches in either manual or automatic transmissions.

While various changes may be made in the detail construction, it is understood that such changes will be within the spirit and scope of the present invention, as is defined by the appended claims.

What I now claim is:

1. A hydraulic clutch for an engine having a rotatable engine output shaft comprising a fluid reservoir, a cam secured to the output shaft of said engine, a fixed clutch housing, a rotatable clutch output shaft, journaled in said clutch housing, a cylinder in said clutch output shaft, a piston in said cylinder having a front side and a rod side, a piston rod extending from the rod side of said piston and engageable with said cam to effect reciprocation of said piston within said cylinder upon rotation of said engine output shaft relative to said clutch output shaft, an annular torque application groove in said clutch output shaft, first hydraulic passage means in said clutch output shaft communicating with said torque application groove and with the face of said piston, an annular torque release groove in said clutch output shaft, second hydraulic passage means in said clutch output shaft communicating with said annular torque release groove and with the rod side of said piston, third hydraulic passage means in said clutch housing communicating with each of said torque application and torque release grooves and with said hydraulic fluid reservoir, a pair of one-way fluid check valves in said third hydraulic passage means for admitting fluid to said first and second hydraulic passage means from said reservoir but precluding flow of fluid back to said reservoir, fourth hydraulic passage means in said clutch housing communicating with each of said torque application and torque release grooves and with said hydraulic fluid reservoir, a torque application fluid flow control valve in said clutch housing between and communicating with said torque application groove and fourth hydraulic passage, a torque release fluid flow control valve in said clutch housing between and communicating with said torque release groove and fourth hydraulic passage, and linkage means connecting said torque application and release control valves so as to close said torque release valve upon opening of said torque application valve and open said torque release valve upon closing of said torque application valve thereby to control reciprocation of said piston and relative rotation between said engine output shaft and said clutch output shaft.

* * * * *